C. E. RIEDEL.
ATTACHMENT FOR SCALES.
APPLICATION FILED OCT. 19, 1916.

1,367,892. Patented Feb. 8, 1921.
2 SHEETS—SHEET 1.

Inventor
Charles E. Riedel
By his Attorneys
Kerr Page Cooper + Hayward

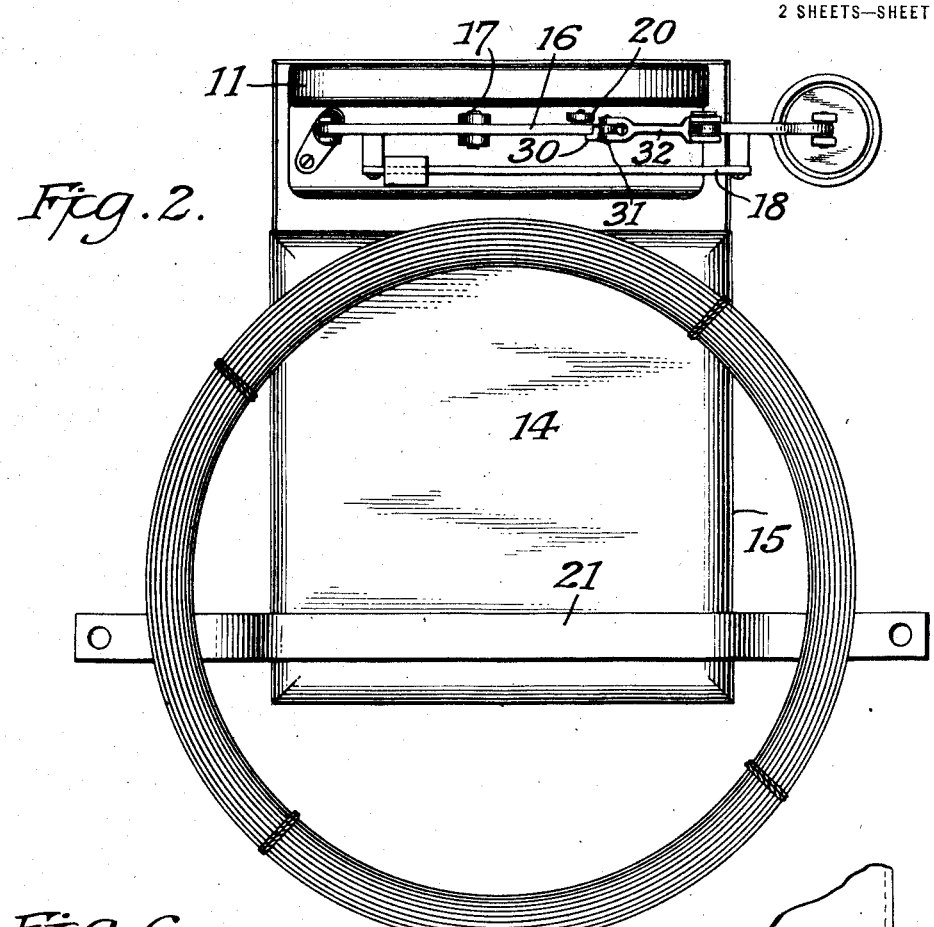

UNITED STATES PATENT OFFICE.

CHARLES E. RIEDEL, OF DETROIT, MICHIGAN, ASSIGNOR TO DETROIT AUTOMATIC SCALE COMPANY, OF ELKHART, INDIANA, A CORPORATION OF INDIANA.

ATTACHMENT FOR SCALES.

1,367,892. Specification of Letters Patent. Patented Feb. 8, 1921.

Application filed October 19, 1916. Serial No. 126,468.

*To all whom it may concern:*

Be it known that I, CHARLES E. RIEDEL, a citizen of the United States, residing at Detroit, in the county of Wayne and State of Michigan, have invented certain new and useful Improvements in Attachments for Scales, of which the following is a full, clear, and exact description.

This invention relates to certain new and useful improvements in attachments for scales and has for its object the provision of certain supplementary devices whereby the uses of a platform scale may be extended for weighing articles which have heretofore been weighed upon steelyards and hanging scales, as examples, coils of rope and automobile tires, may be cited.

Other objects of this invention reside in the provision of improved indicating and weight compensating devices adapted for attachment with the aforesaid supplementary devices. These devices are generally known as "scoop weights" and they are commonly used to counterbalance a scale for the weight of a scoop and to indicate to the customer and clerk that such compensation has been made. The improvements in the scoop weight will be pointed out in more detail in the accompanying specification.

Other objects reside in the modification of a scale of the type shown in the patent to Hopkinson and Ozias #867,671, whereby sacks of grain and similar high articles may be weighed without interference with the main scale beam.

Other objects of this invention will be pointed out in detail in the accompanying specification.

In the drawings:

Fig. 2 is a top plan view of the scale shown in Fig. 1 with the various attachments in place.

Figs. 4 and 5 are details of modifications which adapt a platform scale for weighing coils of material such as wire or rope.

Figs. 6 and 7 are details of the scoop weight device the latter figure showing the weight in coöperation with the scale beam.

Fig. 8 shows another modification of the device used for weighing coils of material on a platform scale.

Figure 1:
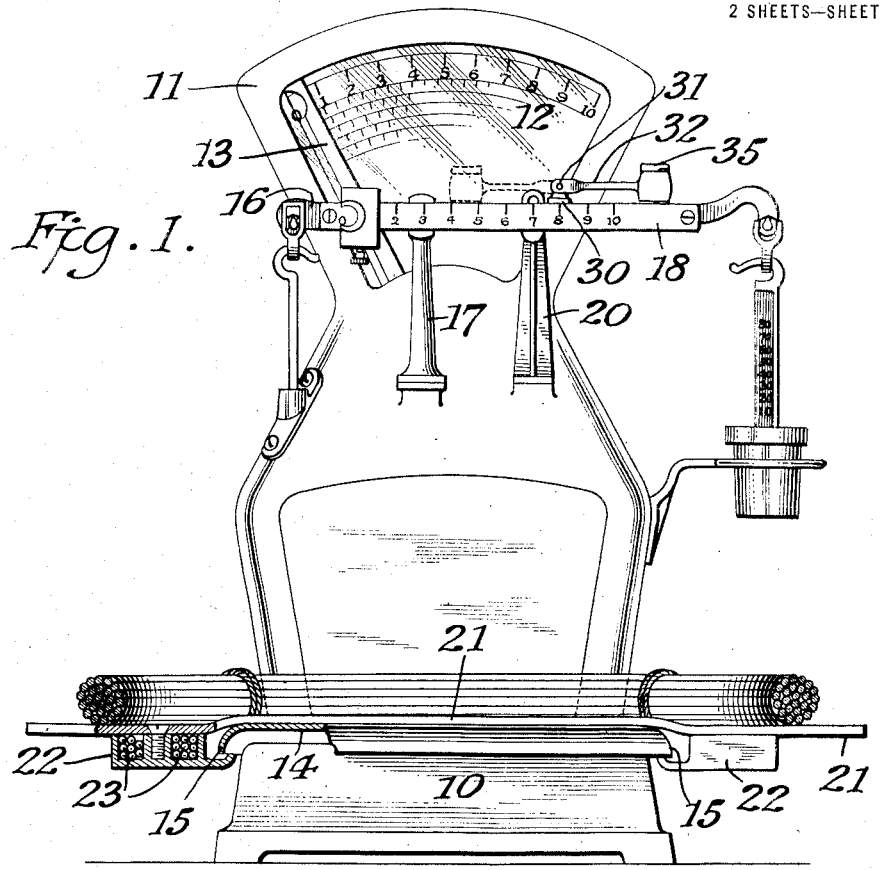
Figure 1 shows a front elevation of a scale of the Hopkinson & Ozias type and shows the scoop weight in "on" position and one of my improved attachments in place on the platform to adapt the scale for weighing a coil of material such as wire or rope.

In more detail Fig. 1 shows a scale having a base 10, chart housing 11, weighing and computing chart 12, indicating hand 13. The platform 14 is supported upon the usual supporting levers in the base and these connect with any desired counterbalancing attachment, for example, those shown in Patent No. 867,671. The platform is preferably provided with overhanging lips 15 which prevent any material spilled thereon from getting inside the base 10. The main scale beam 16 is fulcrumed upon a pedestal 17 which is supported upon the chart housing and this pedestal is of considerable height as shown in Fig. 1 to permit high articles such as sacks of grain to be weighed upon the platform without interference with the graduated beam 18. The graduated beam is secured to brackets fastened to the scale beam 16 and carries the usual sliding poise. The high pedestal construction provides a ready access to the poise when high articles are being weighed upon the platform. A second high pedestal 20 forms the usual trig loop and limits the extreme movement of the beam.

With platform scales of this type it is frequently desirable to weigh coiled material and other articles which would project beyond the platform if placed thereon. Such articles have heretofore been weighed on various forms of hanging scales. To weigh such articles I provide an attachment or supplementary device consisting of a bar 21 curved to correspond with the contour of the platform. This bar is of such length that its ends project beyond the sides of the platform, as shown in Figs. 1 and 2. The bar has secured thereto hook members 22 which are spaced to extend under the lips 15 of the platform. The hook members are secured to the bar by screws and are preferably hollow to provide recesses to receive lead. The lead is added to or removed from the recesses, as may be necessary, to bring the bar and its attached hook members to a certain desired weight. It will be understood that it is necessary to compensate for the weight of this bar (in a manner which will be hereafter explained) and the lead pockets provide a ready means for bringing the bar to a certain definite weight which can be compensated for. The use of the bar is self evident from the drawings. The bar is slipped in place on the platform and the projecting ends form a support for the material, such as for example, a coil of wire. The hook members 22 prevent a preponderance of weight on one arm from tipping the bar. At the same time the bar can be quickly removed from the scale without unfastening any parts and when not in use can be hung up adjacent the scale.

In Figs. 4 and 5 is shown a modification in which the platform 14 is grooved as shown at 24. Bars 25 are placed in these grooves and are pivoted at their outer ends to the scale platform. By swinging the bars pivotally outward to the dotted line position, they will form a platform extension or support which is adapted to receive a coil of wire or other material normally too large to rest properly on the platform.

Fig. 8 shows another modification in which a series of bars 26 are adapted to slide in and out of the platform to form an extension, in a manner which will be readily understood.

It will be understood that with the modifications shown in Figs. 4, 5 and 8, it will not be necessary to compensate for the weight of the bars 25 or 26 as they are always associated with the platform and their weight is constant whether extended or not.

Figure 3:
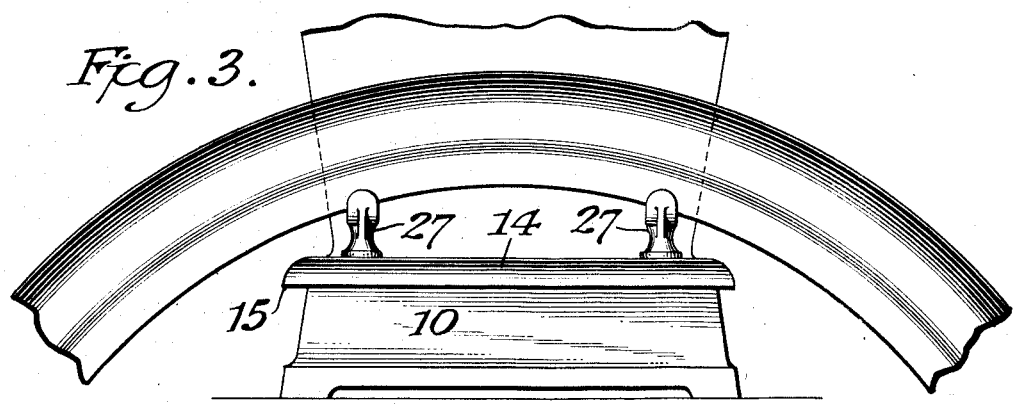
Fig. 3 is a detail view showing another platform attachment to permit an automobile tire to be weighed on the scale.

Fig. 3 shows supplementary devices arranged to weigh a large coil such as an automobile tire, and these devices consist of brackets 27 shaped to receive an automobile tire and provided with feet fitting in the holes in the platform. The brackets may be recessed in any desired manner to receive lead.

When supplemental attachments such as shown in Figs. 1, 2 and 3 are used it is necessary to correct the scale for the weight of the attachment. I provide a pivoted scoop weight for this purpose. The device is generally termed a scoop weight since it is frequently used to compensate for the weight of a scoop on the platform and it is to be understood that the device now to be described is adapted for that use as well as for compensating the scale for the weight of the supplementary devices herein described.

With scales equipped with scoop weights, the sealers of weights and measurements requirements are that these devices must not be removable and also that the customer must be plainly shown whether the scoop weight is on or off. With the construction here employed a bracket 30 is securely fastened to the main scale upon the free end thereof and to the right of the trig loop 20. The bracket carries a boss which extends between the forked ends of an arm 32 carrying the scoop weight. A pivot or pintle 31 extends through the boss and the forked ends of the arm 32 and this pintle is retained in place in the boss by means of a pin (not shown). The end of the arm 32 remote from the pivot 31 is recessed as shown at 33 in Fig. 6 to receive lead and by varying the amount of lead in these pockets the weight of the scoop weight may be varied. It will be understood that the scoop weight is adapted to rest upon the scale beam horizontally to the left and the right of the pivot 31. When in the latter position the scoop is effective to counterbalance the scale for the weight of the scoop or other supplemental device and when to the left of the pivot the scale beam is in balance when the supplementary devices are not in use. By reason of the pivoted construction the scoop weight must take one or the other position, and as it is pivoted to the free end of the beam the compensating action is better than with constructions in which the scoop weight is pivoted to the left of the fulcrum of the beam. In order to take up the shock of impact of the scoop weight and beam I provide a blade spring 34 which is adapted to support the weighted end on the beam as shown in Fig. 7.

Figure 9:
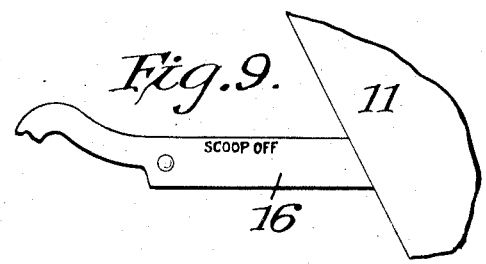
Fig. 9 is a rear view of a portion of the scale, showing the scale beam indication with the scoop weight in "off" position.

In order to indicate to the clerk and the customer the position of the scoop weight I provide an indicating plate 35 which is secured to the weighted end of the arm 32. This plate on the clerk's side has two sets of characters. The characters "Scoop on" appear uppermost when the scoop weight is to the right in the compensating position. The characters "Scoop off" appear uppermost when the scoop weight is resting on the beam to the left of its pivot. The rear of the plate has indicating characters reading "Scoop on" thereon which are adapted to show to the customer at the opposite side of the scale when the scoop weight is in compensating position. The lower portion of the plate 35 is adapted to obscure characters on the scale beam reading "Scoop off." When the scoop weight is swung to the opposite side of the pivot to off position, the plate moves from in front of these characters and displays them to the customer as shown in Fig. 9.

I am aware that pivoted scoop weights have been used on scale beams heretofore but these weights have been used to the left of the fulcrum where their action is much less satisfactory due to their limited range of movement.

It will be understood that this invention is adapted to be modified in various ways as will occur to those skilled in the art. What

I claim as my invention is more particularly pointed out in the appended claims.

I claim:

1. An attachment for a platform scale having a scale beam adapted to permit the weighing of articles which extend beyond the limits of the platform, comprising a bar adapted to slide over the platform and engage the said platform in such a way that tipping of the bar is prevented, in combination with a scoop weight shiftably mounted on the scale beam to compensate for the weight of the said bar when the same is in place.

2. An attachment for a platform scale having a scale beam adapted to permit the weighing of articles which would extend beyond the limits of the platform, said device comprising a member shaped to receive the article to be weighed, and having means associated therewith for removably securing the same to the platform without manipulative fastenings, lead pockets associated with the said member to receive lead to bring the member to a desired weight, and a scoop weight associated with a scale beam for compensating the scale for the additional weight of the said member.

3. A convertible weighing scale comprising a platform scale having a scale beam, said platform being adapted to receive and support a scoop of predetermined weight, and an attachment for said platform adapted to permit the weighing of articles not adapted for weighing in the scoop and which would extend beyond the limits of the platform, said attachment comprising a member shaped to receive the article to be weighed, and having means for removably securing the member to the platform without manipulative fastenings, said member having recesses for the addition or removal of lead to give the attachment a desired weight corresponding to the weight of the scoop which it replaces.

4. An attachment for a platform scale adapted to permit the weighing of articles which would extend beyond the limits of the platform, comprising a member shaped to receive the article to be weighed and having means associated therewith for removably securing the same in position on the platform, and means comprising lead pockets associated with the said member for correcting the weight of said member.

5. An attachment for a platform scale adapted to permit the weighing of articles which would extend beyond the scale platform, comprising, in combination, a bar adapted to project beyond the sides of the platform, and hooks on the underside of the bar to engage under the edges of the platform and prevent the tilting of the bar when a preponderance of weight is on one end thereof.

6. An attachment for a platform scale adapted to permit the weighing of articles which would extend beyond the scale platform, comprising, in combination, a bar adapted to project beyond the sides of the platform, and hooks on the underside of the bar to engage under the edges of the platform and prevent the tilting of the bar when a preponderance of weight is on one end thereof, said hooks having lead pockets therein to receive lead, whereby the bar can be brought to any desired weight.

7. A scoop weight device for a scale, having a scale beam, comprising, in combination, a member pivoted to the free end of the scale beam and adapted by its position to one side of its pivot to compensate for the weight of a scoop or the like, said member, when in contact with the beam on the other side of the pivot, being adapted to coöperate and balance the scale with the scoop or the like removed, said member being weighted at the end remote from the pivot, and having at said end indicating characters indicating back and front to the clerk and customer the "on" or "off" position of the scoop weight, one of the aforesaid indications comprising indicating characters on the scale beam adapted to be masked when the said scale beam characters are not to be displayed.

8. A scoop weight device for a scale having a scale beam, comprising in combination, a member pivoted to the free end of the scale beam and adapted to rest on the beam to the right or left of the pivot, said member being weighted at the end remote from the pivot, and having a plate like member associciated therewith with back and front indicating characters thereon, the characters at one side indicate "Scoop on" and said plate being adapted to obscure characters on the beam reading "Scoop off", the characters on the opposite side of the plate reading "Scoop on" and "Scoop off" and being adapted to display the proper set of characters uppermost according to the position of the scoop weight on the beam.

9. A scoop weight device for a scale, having a scale beam, comprising a member pivoted to the free end of the scale beam and adapted to rest upon said beam to the right or left of the said pivot, said member being weighted at the end remote from the pivot, said weighted end having spring means to take up the shock when the member impacts upon the beam.

10. A scoop weight device for a scale, having a scale beam, comprising a member pivoted to the scale beam at the free end thereof, said member being adapted to rest upon said beam to the right or left of the pivot, said member having a weighted end at the end remote from the pivot, and a lead cup associated with the weighted end to permit the adjusting of the weight thereof.

11. A scoop weight device for a scale having a scale beam, comprising a member pivoted to the scale beam at the free end thereof, said member being adapted to rest upon said beam to the right or left of the pivot, said member having a weighted end at the end remote from the pivot, and a spring associated with the weighted end of said member to take up the shock of impact with the beam.

In testimony whereof I hereunto affix my signature.

CHARLES E. RIEDEL.